United States Patent
Babenko

[11] Patent Number: 6,138,704
[45] Date of Patent: Oct. 31, 2000

[54] METHOD FOR REDUCING DISSIPATION RATE OF FLUID EJECTED INTO BOUNDARY LAYER

[75] Inventor: Victor V. Babenko, Kiev, Ukraine

[73] Assignee: Cortana Corporation, Falls Church, Va.

[21] Appl. No.: 09/223,783

[22] Filed: Dec. 31, 1998

[51] Int. Cl.[7] .................................................. G05D 7/00
[52] U.S. Cl. ........................................ 137/13; 114/67 A
[58] Field of Search ................... 137/13, 602; 114/67 A

[56] References Cited

U.S. PATENT DOCUMENTS

| | | | |
|---|---|---|---|
| 3,414,004 | 12/1968 | Bankston | 137/13 X |
| 3,502,103 | 3/1970 | Verschuur | 137/13 X |
| 3,601,079 | 8/1971 | Giles et al. | 137/13 X |
| 3,822,721 | 7/1974 | Verschuur | 137/13 X |
| 3,826,279 | 7/1974 | Verschuur | 137/13 X |
| 3,886,972 | 6/1975 | Scott et al. | 137/13 X |
| 4,186,679 | 2/1980 | Fabula et al. . | |
| 4,756,326 | 7/1988 | Johnston | 137/13 |
| 4,987,844 | 1/1991 | Nadolink . | |
| 5,165,440 | 11/1992 | Johnston | 137/13 |
| 5,376,697 | 12/1994 | Johnston et al. | 137/13 X |
| 5,388,905 | 2/1995 | Ake et al. | 137/13 X |
| 5,445,095 | 8/1995 | Reed et al. . | |

OTHER PUBLICATIONS

McInville R M et al: "Analysis of large vortical structures in shear layers" AIAA Journal, Aug. 1985, USA vol. 23, No. 8, Aug. 1995 (1995–08), pp. 1165–1171.

Abstract of Japanese Publication No. 9–151914 Published Oct., 1997.

Abstract of Japanese Publication No. 9–151913 Published Oct., 1997.

*Primary Examiner*—Gerald A. Michalsky
*Attorney, Agent, or Firm*—Arnold International; Bruce Y. Arnold

[57] ABSTRACT

Skin friction reduction on a surface moving relative to a fluid can be obtained by ejecting a polymer-water mixture/solution into the boundary layer. The efficacy of the ejected polymer-water mixture/solution is closely related to polymer dissipation out of the boundary layer and conditioning (i.e, lengthening, unwinding or stretching) of the polymer molecules by liquid shear forces immediately before ejection. The invention is a method and apparatus for conditioning and ejecting a polymer-water mixture/solution that improves drag reduction characteristics of the mixture/solution and maintains the mixture/solution in the boundary layer for as long as possible. By improving the drag-reduction characteristics of the polymer-water mixture/solution and by extending the time it remains in the near-wall region, the ejector can increase the performance and reduce the volume and storage requirements of a drag-reduction system. Although this invention was intended for polymer-water mixture/solution ejection, it can be used for ejection of any substance into a flowing fluid.

16 Claims, 6 Drawing Sheets

METHOD FOR REDUCING DISSIPATION RATE OF FLUID EJECTED INTO BOUNDARY LAYER

BACKGROUND OF INVENTION

Injection of high molecular weight materials such as polymers into the boundary layer of a fluid flow has been shown to reduce skin friction drag significantly for both vessels moving relative to water and for pipeline applications. The large polymer molecules interact with the turbulent activity in the near-wall region, absorbing energy and reducing the frequency of burst (high energy fluid moving away from the wall) and sweep (low energy fluid replacing the high energy fluid in the near-wall region) cycles. The reduced burst frequency results in less energy dissipation from the wall and can result in skin friction drag reductions up to 80%. Experiments have shown that the efficacy of polymer molecules for drag reduction is closely related to their molecular weight, their location in the boundary layer, and the degree to which they have been stretched, or "conditioned".

In the past, polymer mixture ejectors have been simple slots that ejected a mixture/solution of polymer and a fluid at an angle to the wall. To attain high drag reduction for a reasonable distance downstream with this ejection approach, large quantities and high concentrations of polymers must be ejected in order to flood the entire boundary area, creating a "polymer ocean" effect. The high polymer consumption rates of these systems have made them impractical for many drag reduction applications.

To be useful for practical applications, a more efficient method for ejecting polymer mixtures for drag reduction needed to be devised.

BRIEF SUMMARY OF THE INVENTION

This invention enables the efficient ejection of fluid mixtures/solutions into the near-wall region of a boundary layer of a fluid flow. The ejector of the present invention has, as a first object of the invention, to condition the polymer prior to ejection so that drag reduction occurs almost immediately following ejection. A second object of the invention is to release polymer only into the boundary layer region, where it can provide the greatest drag reduction. A third object of the invention is to retain the polymer in the near-wall region of the boundary layer, the most effective region for drag reduction, as long as possible.

The ejector system of the present invention preconditions the polymer mixture/solution for improved drag reduction performance using a unique arrangement of flow area restrictions, as well as by employing dimples, grooves and elastomeric materials. The dimples, grooves and flow area restrictions are sized relative to one another and to the Reynolds number of the flow for optimal polymer molecule conditioning (lengthening, unwinding, or stretching) so as to provide optimal drag reduction after ejection into the fluid flow. In addition, the ejector of the present invention uses a new approach to structuring the flow in order to reduce migration/dissipation of the polymer away from the near-wall region. This is achieved by a unique system of slots, each having a carefully designed surface curvature and surface features which establish a duct-like system of longitudinal (i.e., in the direction of the flow) Görtler vortices. Görtler vortices are formed by the centrifugal effect of a fluid flow that is given angular velocity by a concave surface. The duct-like system of Görtler vortices formed by the present invention mimic the spacing of naturally occurring quasi-longitudinal vortex pairs in the boundary layer, but are paired in the opposite orientation. The pairing of naturally occurring quasi-longitudinal vortex pairs is such that they migrate from the wall and are believed to contribute to the development of bursts and sweeps that account for a large portion of hydrodynamic drag. The vortices created by the present invention pair, such that the pressure differentials they create cause the vortices to remain near the wall. This advantageously causes the polymer that has been ejected into the boundary layer to remain in the near-wall region.

BRIEF DESCRIPTION OF THE DRAWINGS

The present invention will become more fully understood from the detailed description given below and the accompanying drawings, which are given by way of illustration only and thus are not limitative of the present invention, wherein.

DETAILED DESCRIPTION

The present invention achieves more effective polymer mixture/solution ejection by releasing a water-polymer mixture/solution into the near-wall region of the boundary layer and by adjusting the mixture/solution flow characteristics so that the mixture/solution remains in the near-wall region. By producing a mixture/solution with flow characteristics that adhere it to the wall, the ejector extends the polymer residence time in the near-wall region before it is diffused into the surrounding water, and thus reduces polymer consumption of a drag reduction system.

Figure 1:
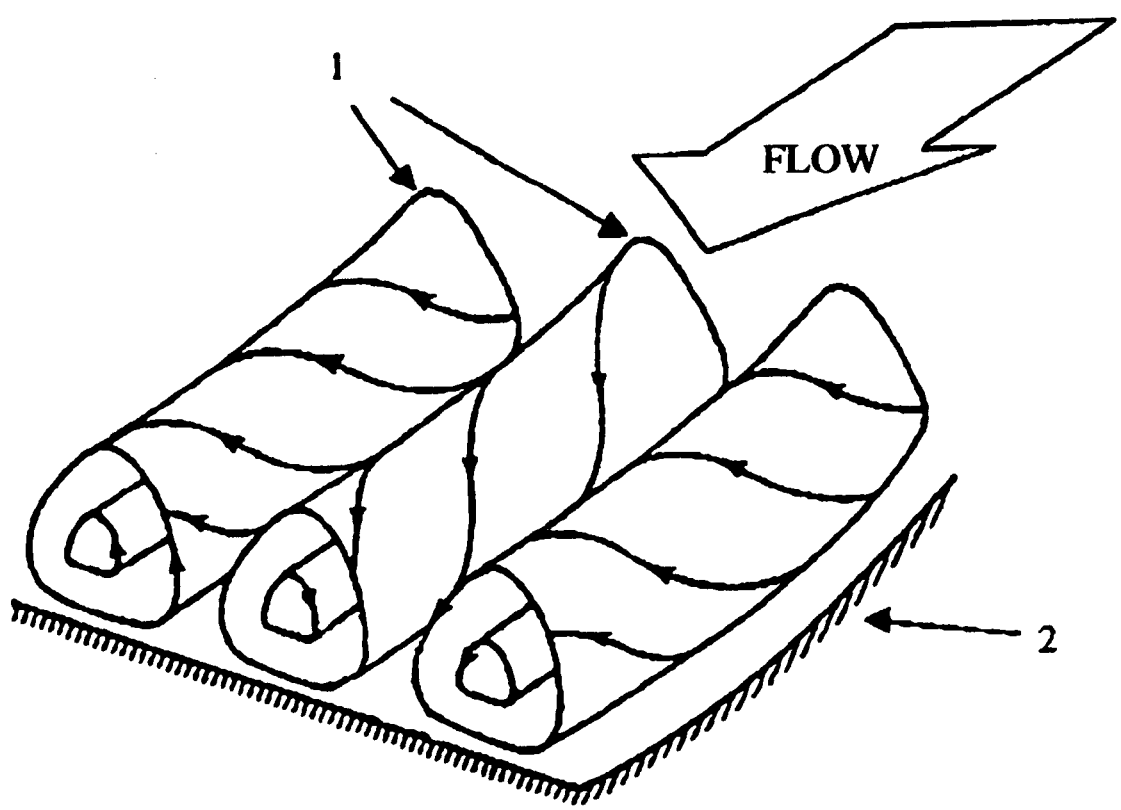
FIG. 1 depicts Görtler vortices forming due to centrifugal forces caused by drag on a concave surface.

Görtler vortices are formed by the centrifugal effect of a fluid flow that is given angular velocity by a concave surface. FIG. 1 depicts naturally occurring Görtler vortices 1 forming due to centrifugal forces caused by drag on a concave surface 2. The surface features of the ejector of the present invention create Görtler vortices that mimic the spacing of the naturally occurring quasi-longitudinal vortex pairs in the boundary layer, but they are paired in the opposite orientation. The pairing of natural quasi-longitudinal vortex pairs is such that they migrate from the wall and are believed to contribute to the development of bursts and sweeps that account for a large portion of hydrodynamic drag.

Figure 2A:
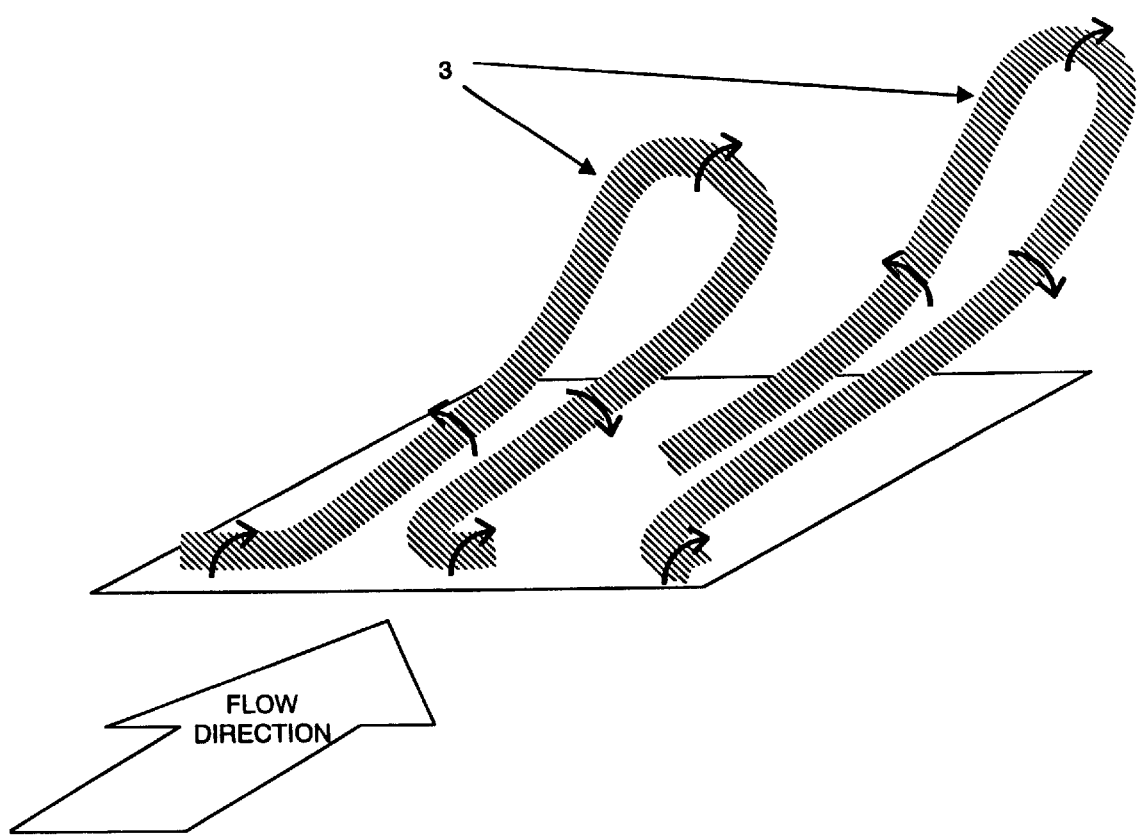
FIG. 2(a) illustrates, in isometric view, naturally generated quasi-longitudinal vortex pairs.
Figure 2B:
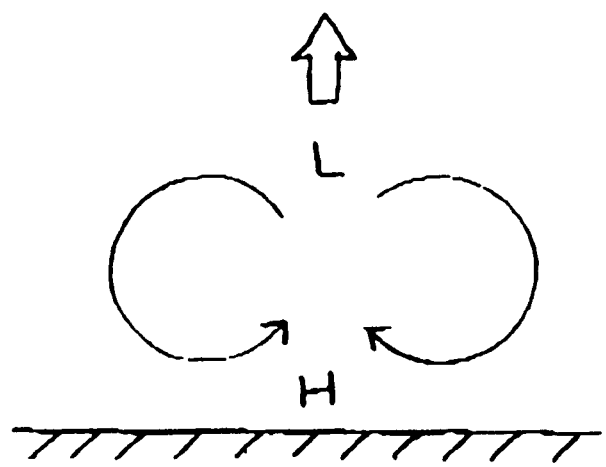
FIG. 2(b) is a cross-sectional view of naturally occurring vortex pairs.
Figure 2C:
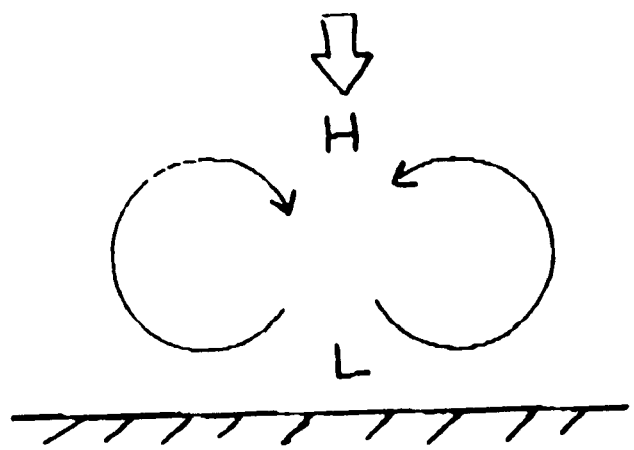
FIG. 2(c) is a cross-sectional view of longitudinal Görtler vortex pairs formed by the vortex duct ejector of the present invention.

FIG. 2(a) depicts an isometric view of quasi-longitudinal vortex pairs. It is generally accepted that flow over a stationary surface creates transverse structures which become distorted into hairpin-shaped vortices 3 near the wall. The quasi-streamwise "legs" of each hairpin-shaped vortex produce a pressure differential normal to the wall that makes the vortex pair migrate away from the surface. FIG. 2(b) is a transverse cross-sectional schematic of a vortex pair inducing a pressure differential that will move it away from the wall. The "H" represents a local higher pressure region, and the "L" represents a local lower pressure region. In contrast to these naturally occurring vortex pairs, the Görtler vortex pairs generated by the ejector of the present invention are paired and spaced so that the pressure differential they create causes them to hug the surface. FIG. 2(c) is a cross-sectional view of a vortex pair which creates a pressure differential that drives the vortex pair in a direction towards the wall, thereby causing the vortex pair to hug the wall. Because the vortices of such a pair remain near the wall, they maintain the polymer that has been ejected by the ejector in the near-wall region and thereby reduce the occurrence of bursts and sweeps. Hereinafter, the ejector of the present invention will be called a "vortex duct" ejector because of its innovative use of vortex structures to control polymer mixture/solution dissipation.

Figure 3:
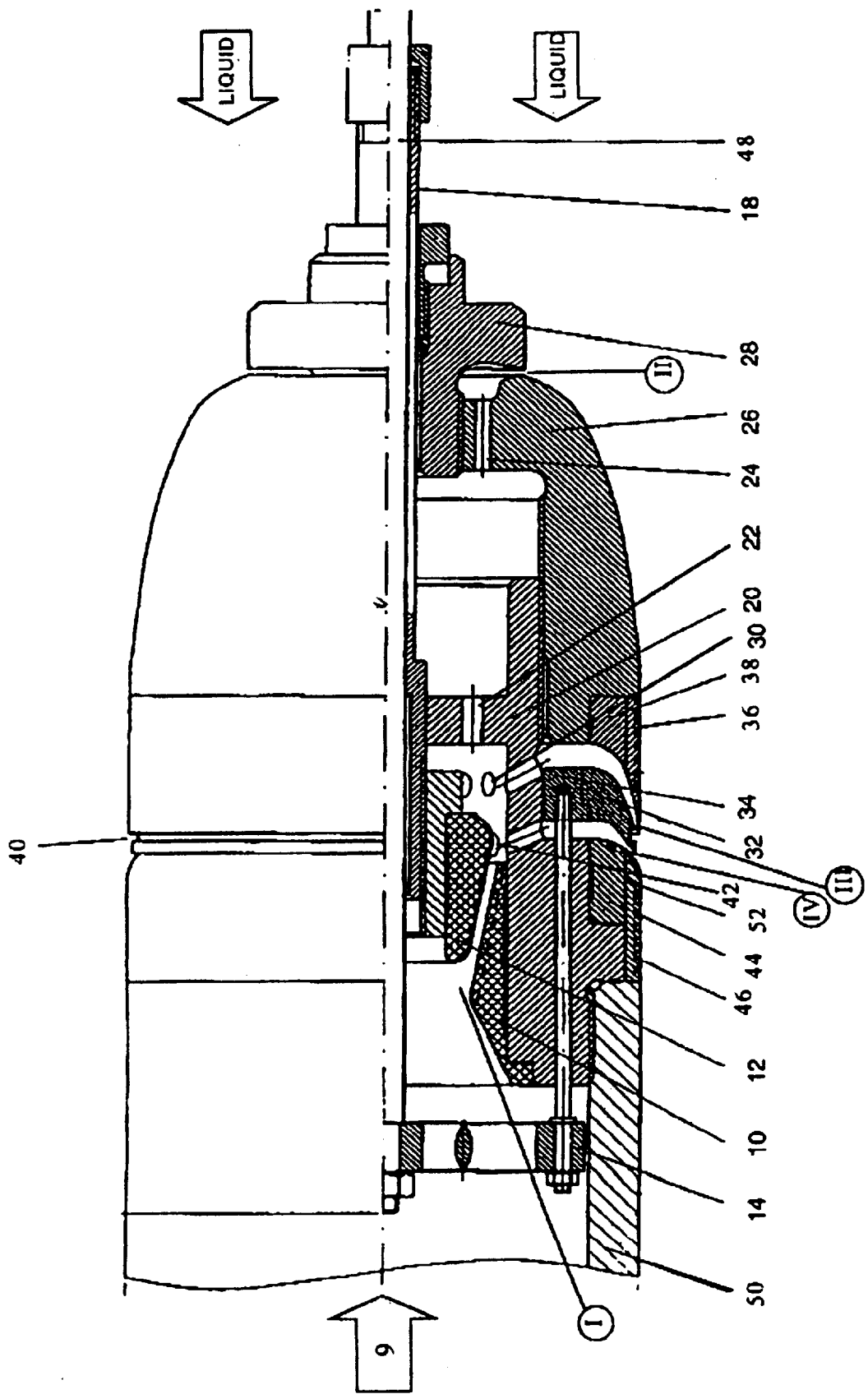
FIG. 3 depicts a side view of the vortex ejector of the invention, with the lower portion thereof being a cross-sectional view which shows the inner components of the vortex duct ejector.

FIG. 3 illustrates the vortex duct ejector of the present invention. Polymer mixture/solution 9 flows into the ejector from the left, moving toward slot I. In this embodiment, the boundary layer to be injected with polymer mixture/solution envelops the vortex duct ejector and the flow is from right to left, just as if the ejector were on a body moving to the right in a stationary medium. Polymer mixture/solution is ejected from the slots II, III, and IV into the boundary layer of the ejector body. Optimal solution concentrations and volume flow rates are determined as required for each application.

Polymer mixture/solution flowing into the ejector from the left is directed toward slot I by diffuser 10 and cone 12. Interaction between one or more vanes (not labeled) attached to the framework 14 reduces the irregularity of the flow. As the flow passes through slot I, dimples in cone 12 and longitudinal slots in diffuser 10 create quasi-longitudinal vortices.

Figure 4:
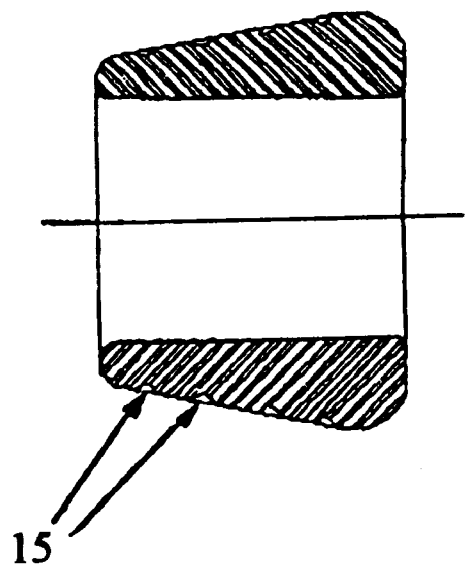
FIG. 4 illustrates, in cross-sectional view, a cone component of the ejector shown in FIG. 3.
Figure 5:
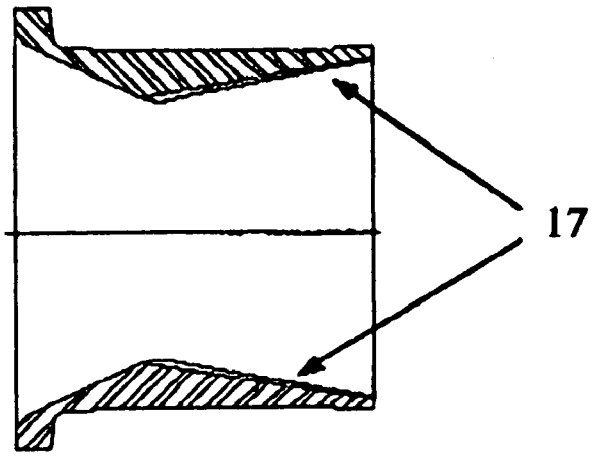
FIG. 5 illustrates, in cross-sectional view, a diffuser component of the ejector shown in FIG. 3.
Figure 6:
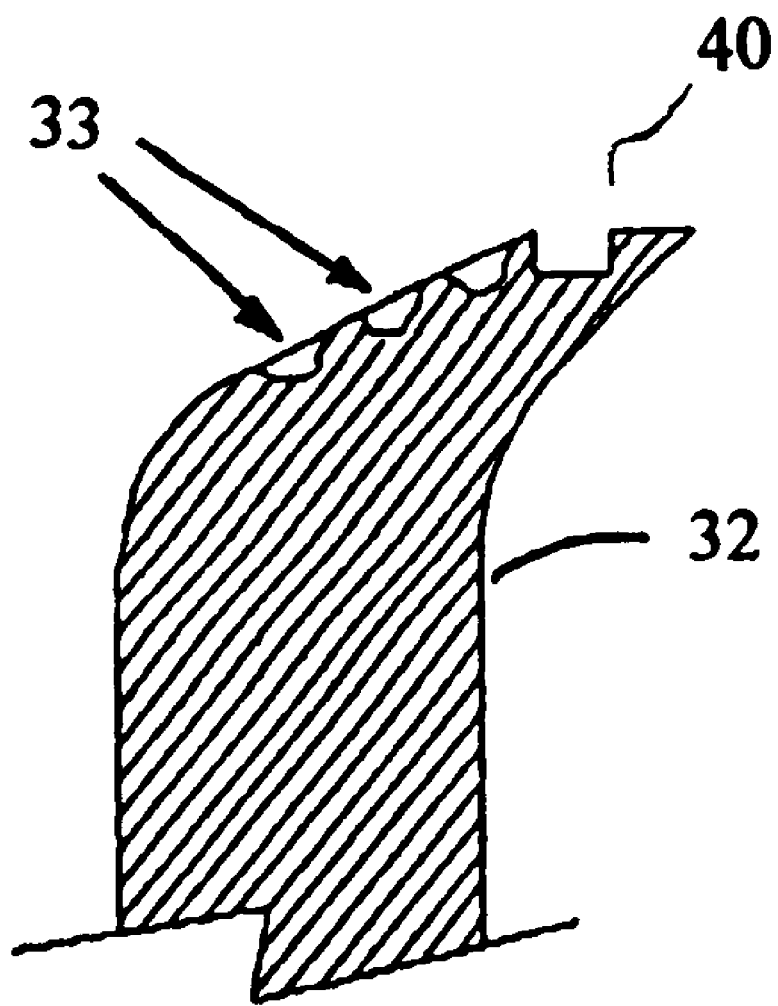
FIG. 6 illustrates, in cross-sectional view, a portion of an ejector ring.

FIG. 4 is a cross-sectional view of the cone 12, illustrating the dimples 15 in cone 12. FIG. 5 is a cross-sectional view of the diffuser 10, illustrating the longitudinal slots 17 in diffuser 10. Interaction of vortices created by the dimples 15 and slots 17 promotes further mixing and stretching of the polymer molecules in the mixture/solution. The width of slot I can be adjusted, or varied, by sliding the central tube 18 with attached cone 12 longitudinally. The materials and features of the diffuser 10 and cone 12 can also be changed or modified to alter the vortical structures. The throttled and conditioned flow then passes out of slot I and through a system of passageways in framework 20. The size of the passageways in framework 20 governs the shape of the dimples on cone 12 according to Condition (1):

$$0.25d_{passageways20} \leqq d_{dimples12} \leqq 0.5d_{passageways20} \qquad \text{Condition (1)}$$

where $d_{passageways20}$ is the diameter of the passageways in framework 20 and $d_{dimples12}$ is the diameter of the dimples in cone 12. The depth (h) of the dimples is given by Equation (1):

$$h_{dimples12}=0.25d_{dimples12} \qquad \text{Equation (1)}$$

where $h_{dimples12}$ is the depth of the dimples in cone 12, and $d_{dimples12}$ is as defined above. In addition, the grooves in diffuser 10 are defined by Equations (2) and (3):

$$B_{grooves10}=d_{dimples12} \qquad \text{Equation (2)}$$

$$W_{grooves10}=h_{grooves10}=0.25d_{dimples12} \qquad \text{Equation (3)}$$

where $B_{grooves10}$ is the center-to-center distance between the grooves in the diffuser 10, $W_{grooves10}$ is the width of each groove in diffuser 10, and $h_{grooves10}$ is the depth of each groove in diffuser 10.

Vortex formation can be enhanced by fabricating the cone (12) from an elastomeric material with characteristics what satisfy the equation $$(E/\rho)^{1/2}=0.5U_{\infty} \qquad \text{Equation (4)}$$

where E is the modulus of elasticity, ρ is the density, and $U_{\infty}$ is the velocity of the exterior flow. For additional vortex enhancement, one may use anisotropic elastomeric material characterized as follows $$2 \leqq E_{long}/E_{xverse} \leqq 5 \qquad \text{Condition (2)}$$

where $E_{long}$ is the longitudinal modulus of elasticity and $E_{xverse}$ is the transverse modulus of elasticity.

The system of passageways in framework 20 can be divided into four groups. The first group 22 passes solution in the longitudinal direction through a second set of passageways 24 in the fairing 26 having a diameter one-half that of the dimples in cone 12 and out into the flow path through slot II. Slot II is a laminar region ejector, and it is intended to thicken and condition the boundary layer upstream of the slots III and IV. The concave shape of the forward surface of the slot formed by stopper 28 creates longitudinal Görtler vortices and the shape formed by fairing 26 (FIG. 3) provides a Coanda surface. The surfaces of slot II are parallel at the aperture. As the flow from slot II enters the boundary layer, it is characterized by longitudinal Görtler vortex structures immediately adjacent an attached flow coming off the downstream Coanda surface. These longitudinal Görtler vortices condition the flow upstream of slot III. Slot II's contribution to thickening and conditioning the boundary layer reduces disturbances caused by the ejected flow at slots III and IV.

Another group of passageways 30 passes the mixture/solution obliquely through the framework 20, the fairing 26, and rings 32, 34, 36 and 38 to exit from slot III. The curvature of the upstream surface of slot III is concave in order to produce a system of longitudinal Görtler vortices, and these vortices are then amplified by dimples on an elastic downstream surface of ejector ring 32. FIG. 6 illustrates, in cross-sectional view, a portion of such an ejector ring 32. The dimensions and pitch of the dimples in ring 32 are given by:

$$\lambda_{dimples32}=d_{dimples32}=((7.19\times10^{5})/Re_{x})+(3.56\times10^{-5})(Re_{x})+1.71 \qquad \text{Equation (5)}$$

and $$h_{dimples32} \leqq 0.5d_{dimples32} \qquad \text{Equation (6)}$$

where $\lambda_{dimples32}$, $d_{dimples32}$ and $h_{dimples32}$ are the pitch, diameter and depth, respectively, in wall units y*, of the dimples in ring 32, and $Re_x$ is the Reynolds number of the water flow immediately downstream of slot IV. As is well known in the art, wall units are a non-dimensional measurement of distance from a wall. They can be expressed as a length dimension using the following equation.

$$y = (y^* v)/\mu \quad \text{Equation (7)}$$

where y is a dimensioned length, v is the kinematic viscosity of the fluid and $\mu$ is the friction velocity of the fluid.

Fabricating ring 32 from elastomeric material can further enhance the Görtler vortices forming in slot III. If an elastic material is chosen, its characteristics should satisfy Equation (4), above. For additional enhancement effects, one may use anisotropic elastomeric material characterized by Condition (2), above.

When ring 32 is located in a more upstream position than that illustrated in FIG. 3, such that its transverse groove is located beneath the edge of ring 36, the transverse groove 40 creates a stationary transverse vortex within transverse groove 40. The low pressure created by this transverse vortex draws the flow ejected from slot III, including the longitudinal Görtler vortices, against the wall and stabilizes the flow ejected from slot III. When ring 32 is located farther from ring 36, the transverse groove generates a series of transverse vortex rings, which escape and migrate downstream with the flow. The frequency at which these transverse vortices are released can be controlled by periodic motion of rings 32 and 34 (i.e., by oscillating central rod 48 which indirectly supports ring 34 via frame 14), or by changing the elastic characteristics of the ring 32 material. The dimensions of the transverse groove are given by:

$$W_{xverse40} = h_{xverse40} = 0.5 d_{dimple32} \quad \text{Equation (8)}$$

where $w_{xverse40}$ is the width and $h_{xverse40}$ is the depth, respectively, of the transverse groove 40.

The last group of passageways 42 in framework 20 passes the polymer mixture/solution obliquely into the space between adjustable rings 32, 34, 44 and 46 and out into the flow stream through slot IV. As with slot III, the curvature of the upstream surface of slot IV creates a system of longitudinal Görtler vortices that are amplified by the dimples in rings 44 and 46. These Görtler vortices interact with the vortices coming from slot III to form longitudinal waveguides that act to retain the polymer solution near the wall. The dimensions and spacing of the dimples in rings 44 and 46 are governed by the same equations as the dimples in rings 32 and 34.

The width of slots I, III and IV can be either adjusted or oscillated by sliding cone 12 and/or the rings 32 and 34 longitudinally. Cone 12 is articulated on the end of tube 18, and rings 32 and 34 are articulated by the central rod 48 via fasteners to frame 14. By adjusting the slot widths, one can vary the ejection velocity of the mixture/solution. The most effective drag reduction usually occurs when the ejection velocity is in a range between 5% and 10% of the free stream velocity. The ejector body 50 and slot widths should be adjusted to provide a mixture/solution flow velocity in this range for the desired mixture/solution flow rate. An entirely different slot structure can be achieved by removing rings 32 and 34 and replacing rings 44 and 46 with rings featuring longitudinal slots as detailed by pointer 52. The longitudinal slots are positioned at an approximate multiple of the spacing of the naturally occurring quasi-longitudinal vortex pairs and create high-powered longitudinal vortices.

Of course, the ejector of this invention is not to be limited to the embodiment specifically illustrated. Indeed numerous variations of the ducted vortex ejector are possible. For example, rings 32, 34, 44 and 46 may be replaced with rings having different material and structural characteristics. Rather the scope of the invention shall be defined as set forth in the following claims and their legal equivalents. Various modifications will occur to those skilled in the art as a result of reading the above description, and all such modifications as would be obvious to one of ordinary skill in the art are intended to be within the spirit of the invention disclosed.

What is claimed is:

1. A method of conditioning a drag-reducing substance prior to its release into a first fluid, and of releasing it into the first fluid, there being relative motion between said first fluid and a first surface so as to form a first fluid flow path, said method comprising the following steps:

(a) conditioning the drag-reducing substance using fluid shear forces by causing a second fluid which includes said drag-reducing substance to flow between surfaces having conditioning means to thereby cause the drag-reducing molecules in said second fluid be in condition for reducing drag; and, (b) releasing the conditioned drag-reducing substance into a region consisting substantially of only the near-wall region of a boundary layer of the first fluid by causing the second fluid to flow over a convex Coanda surface as it enters the flow path of the first fluid, said convex Coanda surface being located on the downstream side of a slot through which the second fluid enters the flow path immediately adjacent a wall, and (c) on the upstream of side of said slot, using a concave surface to establish vortices which pair together so as to produce pressure differentials having lower pressure regions immediately adjacent said first surface, thereby causing the drag-reducing substance to remain in the vicinity immediately adjacent said first surface while said vortices are operative.

2. The method of claim 1, wherein the primary constituent of said second fluid is the same substance as the primary constituent of said first fluid.

3. The method of claim 2, wherein the primary constituent of said first fluid and the primary constituent of said second fluid is water.

4. The method of claim 1, wherein the primary constituent of said first fluid is a hydrocarbon.

5. A method of releasing a drag-reducing substance into a region consisting substantially of only the boundary layer of a first fluid flowing relative to a surface, said method comprising the following steps:

(a) ejecting, through a first slot having a concave upstream surface, a flow that is characterized by longitudinal G örtler vortices lying immediately adjacent an attached flow, (b) ejecting the drag-reducing substance through one or more slots, each of the one or more slots including a convex Coanda surface located on the downstream side thereof immediately adjacent a wall over which the drag-reducing substance flows as it enters the flow path of the first fluid.

6. The method of claim 5, wherein the drag-reducing substance comprises a polymer.

7. A method of causing a drag-reducing substance that is released into the boundary layer of a first fluid flowing relative to a first surface to remain in the immediate vicinity of said first surface, said method comprising the following steps, performed in the order indicated:

(a) conditioning the drag-reducing substance using fluid shear forces by causing a second fluid which includes said drag-reducing substance to flow between surfaces having means to condition the drag-reducing molecules in said second fluid; and (b) causing the second fluid to flow over a concave surface so as to establish vortices which pair together so as to produce lower pressure regions in the boundary layer of said first fluid adjacent said surface, thereby causing the drag-reducing substance to remain in the vicinity immediately adjacent said first surface while said vortices are operative.

8. A method of conditioning a drag-reducing substance prior to its release into a first fluid, and of releasing it into the first fluid, there being relative motion between said first fluid and a surface so as to form a first fluid flow path, said method comprising the following steps:

(a) conditioning the drag-reducing substance using fluid shear forces by causing a second fluid which includes said drag-reducing substance to flow between opposed surfaces, said opposed surfaces having one of dimples or slots therein, to thereby cause the drag-reducing molecules in said second fluid to unwind in said second fluid; and, (b) releasing the drag-reducing substance into a region consisting substantially of only the near-wall region of a boundary layer of the first fluid by causing the second fluid to flow over a convex Coanda surface as it enters the flow path of the first fluid, said convex Coanda surface being located on the downstream side of a slot through which the second fluid enters the flow path immediately adjacent a wall.

9. The method of claim 8, wherein the primary constituent of said second fluid is the same substance as the primary constituent of said first fluid.

10. The method of claim 9, wherein the primary constituent of said first fluid and the primary constituent of said second fluid is water.

11. The method of claim 8, wherein the primary constituent of said first fluid is a hydrocarbon.

12. The method of claim 8, wherein, upstream of the point of release as set forth in step (b), fluid is released through a slot having a concave shape on its forward surface to thereby create vortices in said second fluid which pair together so as to produce pressure differentials having lower pressure regions immediately adjacent a surface downstream of said point of release, thereby causing the drag-reducing substance to remain in the vicinity immediately adjacent said downstream surface while said vortices are operative.

13. The method of claim 12, wherein said slot having a concave shape on its forward surface has a convex Coanda surface on its downstream side.

14. The method of claim 13, wherein the drag-reducing substance comprises a polymer.

15. The method of claim 8, wherein, prior to step (b) thereof, the boundary layer is thickened and conditioned by ejecting, through a slot which lies upstream of said slot which includes a convex Coanda surface, a flow that is characterized by longitudinal Göertler vortices lying immediately adjacent an attached flow.

16. A method of causing a substance that is released into the boundary layer of a fluid flowing relative to a first surface to remain in the immediate vicinity of said surface, said method comprising the following steps, performed in the order indicated:

(a) causing fluid to flow over a concave surface so as to establish vortices which pair together so as to produce lower pressure regions in the boundary layer of a fluid flowing adjacent said surface, (b) downstream of the concave surface, releasing said substance into the boundary layer; and (c) extending the time said vortices are operative by causing the fluid to flow over a surface having dimples therein.

* * * * *

UNITED STATES PATENT AND TRADEMARK OFFICE
CERTIFICATE OF CORRECTION

PATENT NO. : 6,138,704
DATED : Oct. 31, 2000
INVENTOR(S) : Babenko

It is certified that error appears in the above-indentified patent and that said Letters Patent is hereby corrected as shown below:

At col. 1, line 6, after "materials" insert a comma;
At col. 1, line 7, after "flow" insert a comma;
At col. 1, line 67, change "mimic" to -- mimics --;
At col. 3, line 1, change "which" to -- that --;
At col. 4, line 14, change "what" to -- that --;
At col. 4, line 41, after "adjacent" insert -- to --;
At col. 5, line 67, after "Indeed" insert a comma;
At col. 6, line 4, after "Rather" insert a comma;
At col. 6, line 19, after "fluid" insert -- to -- ;
At col. 6, line 29, after "adjacent" insert -- to --;
At col. 6, line 30, change "upstream of side" to -- upstream side --;
At col. 6, line 33, after "adjacent" insert --to --;
At col. 6, line 50, after "longitudinal" delete "G";
At col. 6, line 51, change "örtler" to -- Görtler --;
At col. 7, line 9, after "adjacent" insert --to --;
At col. 7, line 31, after "adjacent" insert -- to --;

UNITED STATES PATENT AND TRADEMARK OFFICE
CERTIFICATE OF CORRECTION

PATENT NO. : 6,138,704
DATED : Oct. 31, 2000
INVENTOR(S) : Babenko

It is certified that error appears in the above-indentified patent and that said Letters Patent is hereby corrected as shown below:

At col. 8, line 6, after "adjacent" insert - - to - -;
At col. 8, line 9, after "adjacent" insert - - to –;
At col. 8, line 20, change "Göertler" to - - Görtler - -;
At col. 8, line 21, after "adjacent" insert - - to- -;
At col. 8, line 31, after "adjacent" insert - - to - -.

Signed and Sealed this

Fifteenth Day of May, 2001

Attest:

NICHOLAS P. GODICI

Attesting Officer   Acting Director of the United States Patent and Trademark Office